United States Patent
Burg (10) Patent No.: US 6,219,413 B1
(45) Date of Patent: Apr. 17, 2001

(54) APPARATUS AND METHOD FOR CALLED-PARTY TELEPHONE MESSAGING WHILE INTERCONNECTED TO A DATA NETWORK

(75) Inventor: Frederick Murray Burg, West Long Branch, NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 08/908,669

(22) Filed: Aug. 7, 1997

(51) Int. Cl.[7] ............................ H04M 11/00; H04M 3/42
(52) U.S. Cl. .................. 379/215; 379/93.35; 370/352
(58) Field of Search ..................... 379/88.12, 88.13, 379/88.16, 88.17, 88.19, 88.2, 210, 211, 212, 215, 93.15; 370/352

(56) References Cited

U.S. PATENT DOCUMENTS

| | | | |
|---|---|---|---|
| 5,327,486 | * | 7/1994 | Wolff et al. .......................... 379/210 |
| 5,533,102 | * | 7/1996 | Robinson et al. .................... 379/215 |
| 5,625,676 | * | 4/1997 | Greco et al. ......................... 379/201 |
| 5,651,054 | * | 7/1997 | Dunn et al. .......................... 379/210 |
| 5,652,789 | * | 7/1997 | Miner et al. ......................... 379/201 |
| 5,805,587 | * | 9/1998 | Norris et al. ......................... 379/212 |
| 5,809,128 | * | 9/1998 | McMullin ............................ 379/215 |
| 5,946,386 | * | 8/1999 | Rogers et al. ....................... 379/265 |

* cited by examiner

Primary Examiner—Krista Zele
Assistant Examiner—Roland G. Foster (57) ABSTRACT

An apparatus and method allow a called party, who is utilizing the telephone transmission line to connect to a data network, and as such is unable to directly receive an incoming phone call from a calling party, to be able to provide a specific response message to the calling party while not requiring the called party to directly communicate with the calling party.

20 Claims, 4 Drawing Sheets

APPARATUS AND METHOD FOR CALLED-PARTY TELEPHONE MESSAGING WHILE INTERCONNECTED TO A DATA NETWORK

BACKGROUND OF THE INVENTION

The invention relates to an apparatus and method for responding to an incoming telephone call when the called party is utilizing the telephone transmission line to provide interconnection of the called party's computer to a data network. More specifically, the invention relates to an apparatus and method for providing the called party with the capability to respond to the incoming phone call by sending a voice message to the calling party while the called party remains connected to the data network.

When an individual is interconnected on-line to a data network, such as the Internet public data network, the individual's telephone transmission line is utilized to connect that individual's computer to the network. When the individual is utilizing that line to connect to the network, the transmission line cannot be utilized to receive incoming phone calls. A caller trying to call the individual will receive a busy signal from the local exchange carrier (LEC) after the LEC tries to place the call to the called party.

In this situation where a called party is utilizing the telephone transmission line to connect to the Internet, there are known methods for responding to the incoming phone call. However, these known methods suffer drawbacks. Local Exchange Carriers (LEC) currently provide services where, if a called party's phone line is busy, the LEC can provide a pre-recorded message to the calling party via, for example, an Interactive Voice Response (IVR) system. This pre-recorded message provides information to the calling party regarding the availability of the called party for accepting the incoming phone call. This information, for example, can notify the calling party that the called party's phone line is busy and request that the calling party call back at a later time. Whereas this pre-recorded message is able to provide information to the calling party, drawbacks with this known method include the fact that this system does not inform the called party that they have an incoming call and does not provide any flexibility for the called party to personalize a response message to a particular calling party.

Because the called party is not informed that they have an incoming call, the called party does not have the option of accepting the call. Therefore, all incoming calls will receive the same message that the called party's phone line is busy. Additionally, since the response message is pre-recorded, the called party does not have the opportunity to provide a specific message to a calling party in response to the incoming call. Depending upon the called party's unique circumstances at the time of the call, the called party may want to provide a specific, tailored message to a calling party. This message, for example, could inform the caller that the called party is currently connected to the Internet and could also request the caller to call back at a specific time. With current IVR systems, the called party does not have the capability to provide a specific message to a calling party that is composed by the called party based on the circumstances at the time the call is being placed.

Additional systems are available that are able to notify a called party of an incoming phone call while the phone line is being utilized by the called party. An example of this type of service is the "call waiting" service provided by a telephone service provider. This service notifies a called party who is then using the telephone that another incoming call has been received. The called party can either accept the incoming call or ignore the call in response to the notification of the second call.

This same type of service is also available to a called party that is utilizing the telephone line to interconnect to the Internet. The Internet service provider can provide a signal to the called party that the called party has an incoming telephone call. But again, as with the "call waiting" service described above, the called party has the option of either accepting the call or ignoring the call. If the called party desires to accept the call, the called party can utilize the computer's microphone to talk to the calling party over the established data link. However, if the called party's computer is not powerful enough to support real-time voice communications, this option is not available to the called party.

Neither of these two "call waiting" services addressed above provide the called party with the option of responding to the incoming call by sending a message to the calling party. The called party only has the options of accepting the call or not accepting the call. If the call is not accepted, the calling party either receives a busy signal or receives a pre-recorded message as discussed above. Again, with these services, as with the Interactive Voice Response service discussed previously, there is no capability for the called party to provide a specific message to a calling party in response to the incoming phone call without accepting the call.

Therefore, it would be desirable to provide an apparatus and method for allowing a called party, already connected to a data network using a telephone transmission line to be able to provide a specific message to a calling party attempting to access the called party via that transmission line while not requiring the called party to directly communicate with the calling party.

SUMMARY OF THE INVENTION

The drawbacks of the messaging systems in the prior art are overcome by the present invention which includes an apparatus and method for responding to an incoming phone call when the called party is utilizing the telephone transmission line for connecting to a data network. The present invention allows the called party to compose and send a specific response message to the calling party without requiring the called party to directly communicate with the calling party.

In accordance with the present invention there is provided a called party messaging system. The called party is connected to a data network by utilizing the telephone transmission line to connect the called party's computer to the data network. When an incoming call is placed to the called party, the Local Exchange Carrier (LEC) detects that the called party's telephone line is busy and then, for example, through a "call-forward on busy signal" service that is established with the LEC by the called party, the LEC directs the call to a telephony gateway that is resident in the network of the network service provider. The telephony gateway checks the status of the service provider to determine if the called party's line is busy due to being connected to the network service provider. If the called party is not connected to the service provider, and therefore the line is busy for some other reason (e.g. the called party is utilizing the phone line to talk to another party on the phone) the telephony gateway directs the call back to the LEC and the LEC provides a busy signal, or other programmed response, to the calling party. If the called party is connected to the network service provider, the telephony gateway sends a signal to the called party's computer through the telephone transmission line that notifies the called party that they have an incoming call.

When the telephony gateway notifies the called party of the incoming call, it also provides the called party with the options of accepting the call, declining to accept the call, or responding to the call by providing a response message to the calling party. If the called party chooses to respond to the call by providing a response message, the called party can either send a text response message or an audio response message to the telephony gateway for further transmission to the LEC and, ultimately, to the calling party. The telephony gateway would convert any text message sent by the called party into a voice message for transmission to the calling party by using known text-to-speech software. An audio message sent by the called party would be converted to a digital data stream by the called party's computer and be interleaved with any other data being sent to the network by the called party's computer over the telephone transmission line for receipt by the telephony gateway.

The gateway would then convert the digitally encoded audio message into an analog voice message and send the voice message to the LEC for further transmission to the calling party.

In this manner, a party who is utilizing the telephone transmission line to connect to a data network can respond to an incoming call by composing and sending a message to the calling party. The called party is able to generate and communicate a specific message to the calling party without being required to accept the call from the calling party.

DETAILED DESCRIPTION

Figure 1:
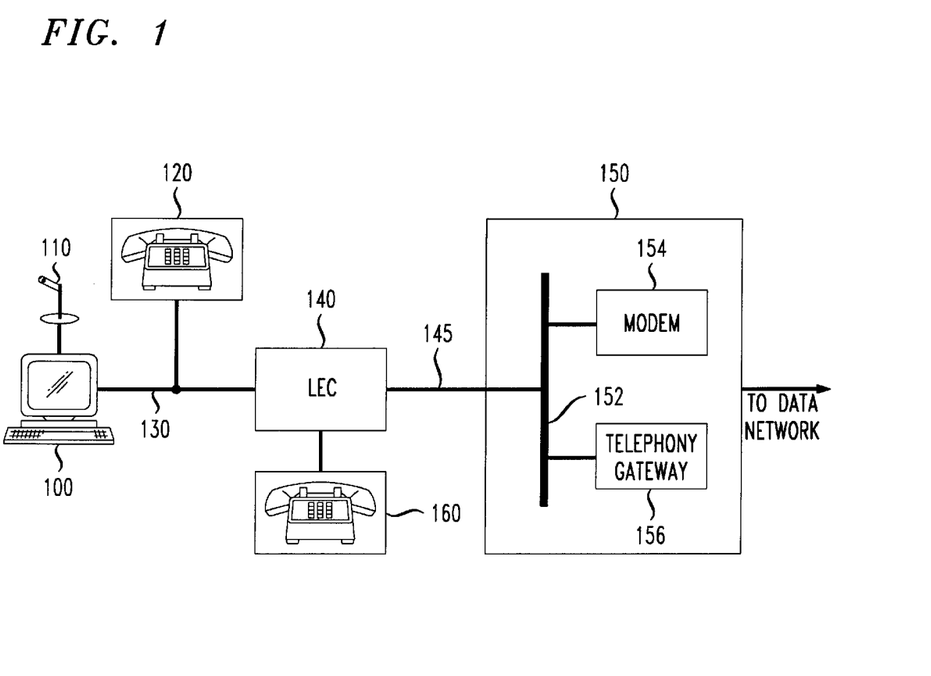
FIG. 1 illustrates one embodiment of a telecommunications link in which the present invention may be practiced.

FIG. 1 illustrates one embodiment of a telecommunications link in which the present invention may be utilized to provide a called party that is interconnected to a data network with the capability to be able to respond to a calling party's incoming phone call by generating and sending a response message to the calling party. As shown in FIG. 1, a called party is interconnected to a data network, which may be the Internet public data network, by utilizing the called party's computer 100 to connect to a data network service connection, or provider, 150. The called party's computer 100 utilizes the telephone transmission line 130 to connect the computer to LEC 140. LEC 140 communicates with data network service provider 150 through transmission line 145. As is well known in the art, computer 100 contains a modem (not shown) to dial into the data network service provider 150. The connection between computer 100 and service provider 150 is made by the telephone local exchange carrier 140. In this manner, a called party utilizes the called party's telephone transmission line 130 to connect the called party's computer 100 to the data network service provider 150. Access to the data network is provided to the called party by the data network service provider.

As can be seen in FIG. 1, the called party's telephone 120 utilizes the same telephone transmission line 130 to connect to LEC 140 as does computer 100. As such, only one connection at a time, either a telephone connection by telephone 120 or a data connection by computer 100, may be established over transmission line 130. Therefore, as a result of the called party's use of the telephone transmission line 130 to connect computer 100 to network service provider 150, the transmission line is not able to be utilized to receive incoming telephone calls on the line.

When a calling party attempts to place a telephone call to the called party while the called party is utilizing computer 100 to connect to the data network, the LEC will not be able to complete the connection request. LEC 140 will attempt to connect the calling party's phone 160 with the called party's phone 120. When LEC 140 attempts to connect the call to the called party's phone 120, the LEC will determine that telephone transmission line 130 is currently being utilized and, therefore, LEC 140 will not be able to complete the call request.

When LEC 140 determines that the call request cannot be completed, LEC 140 will forward the call request to the data network service provider 150. LEC 140 forwards the call request to the network service provider as a result, for example, of a "call forward on busy" service that is established with the LEC by the called party. Network service provider 150 includes a telephony gateway 156. Telephony gateway 156 communicates with LEC 140 and the called party's computer 100 by utilizing transmission lines 145 and 130. When LEC 140 forwards the calling party's phone connection request to the network service provider 150, telephony gateway 156 is notified by LEC 140 that the called party has an incoming call. Telephony gateway 156 then determines whether the called party's computer 100 is logged into the data network service provider. If the called party's computer is logged onto the network, then the telephony gateway will take steps to notify the called party that they have received an incoming call and will ask the called party how they would like to respond to the incoming call. This process will be described in detail later in this specification. If the telephony gateway determines that the called party is not logged into the network, the telephony gateway will not process the call request any further and will send the call request back to the LEC where the LEC will handle the call request in accordance with the LEC's programmed operating procedures.

As stated above, when telephony gateway 156 receives a forwarded call from LEC 140, gateway 156 will check mapping tables within network service provider 150 to determine if the called party is connected to network service provider 150. The mapping tables provide a status as to phone connections into modem 154 and thus, into network service provider 150 at any given time. Telephony gateway 156 communicates with modem 154 over local area network (LAN) 152. LAN 152 provides for the transmission of data between the components of the data network service provider.

If the called party's computer is logged into the network service provider, as stated previously, the telephony gateway will notify the called party that they have received an incoming call and will provide the called party with options as to how they would like to respond to the incoming call. Telephony gateway 156 will transmit a digital data message to the called party's computer 100 by sending the message over LAN 152 to modem 154 for transmission over transmission lines 145 and 130 to the called party's computer 100. The format and content of the received message at the called party's computer and the format and content of the called party's response message to the calling party's incoming phone call can be embodied in numerous ways. Several alternative embodiments for the format and content of these messages will be described later in this specification. However, regardless of how these messages are formatted, in each contemplated embodiment, the present invention provides the option for the called party to send a message to the calling party in response to the calling party's phone call.

Figure 2:
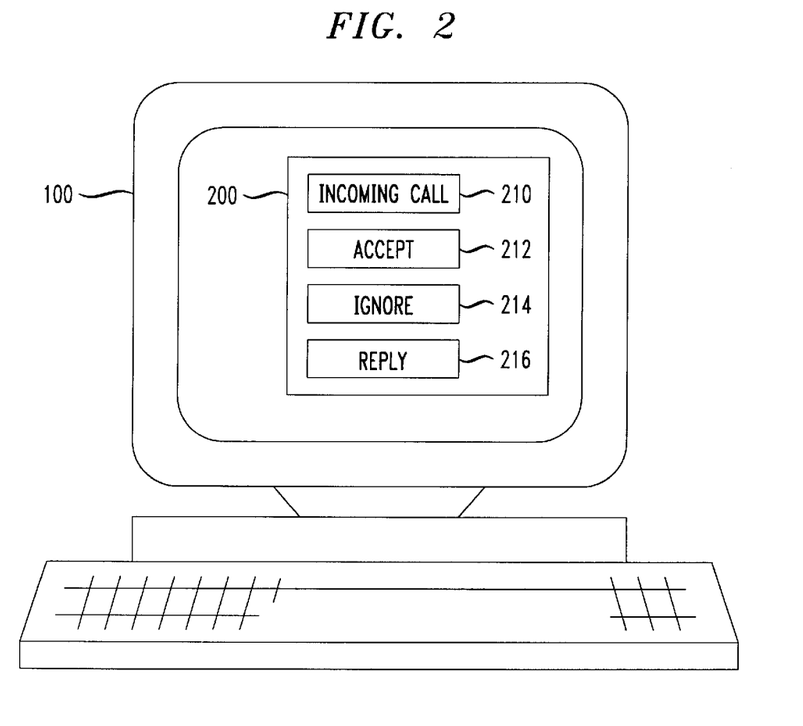
FIG. 2 illustrates one embodiment of a call notification page in accordance with the present invention.

One embodiment for the format and content of the messages sent to and from the called party is described as follows. When telephony gateway 156 informs the called party of an incoming phone call, gateway 156 downloads a Call Notification Page 200, as depicted in FIG. 2, to the called party's computer 100. Call Notification Page 200 is depicted as a "pop-up" window that appears on the monitor of the called party's computer 100 and is overlaid on the particular file that the called party is currently viewing on the monitor. Call Notification Page 200 provides the called party with information that the called party has received an incoming call, as displayed in window 210. Call Notification Page 200 provides the called party with various options for handling the incoming call, with each option displayed in an option window. The called party is provided with the options of accepting the call, call accept window 212, ignoring the call, ignore window 214, or replying to the incoming call with a message reply, reply window 216. To select a particular option, the called party can either click on the particular option window that is desired by utilizing the computer's mouse or utilize other means that are well known in the art for selecting from options presented by a computer program.

If the called party chooses to accept the call by selecting window 212, the called party can directly communicate with the calling party by utilizing the computer's microphone 110 to communicate with the calling party via the established data connection over transmission lines 130 and 145 with the Internet service provider and the LEC. The ability to communicate with a calling party's telephone by utilizing a computer microphone connected to an Internet-type data network is well-known in the art and will not be described in further detail.

If the called party chooses option window 214, and thus ignores the call, telephony gateway 156 will redirect the call back to LEC 140 and LEC 140 will respond in accordance with the established LEC operating procedures.

The third option that is available to the called party in handling an incoming phone call with the present invention is to choose to reply to the phone call by selecting option window 216. By selecting option window 216, the called party is able to generate and send a non-real time response message to the calling party. By sending a non-real time response message, the called party, is able to respond to the calling party's call without directly communicating with the calling party. In this manner, the called party is able to provide a specifically tailored response message to the calling party, formulated based on the called party's situation at that time, while remaining interconnected to the data network and without requiring real time voice communications with the calling party.

Figure 3A:
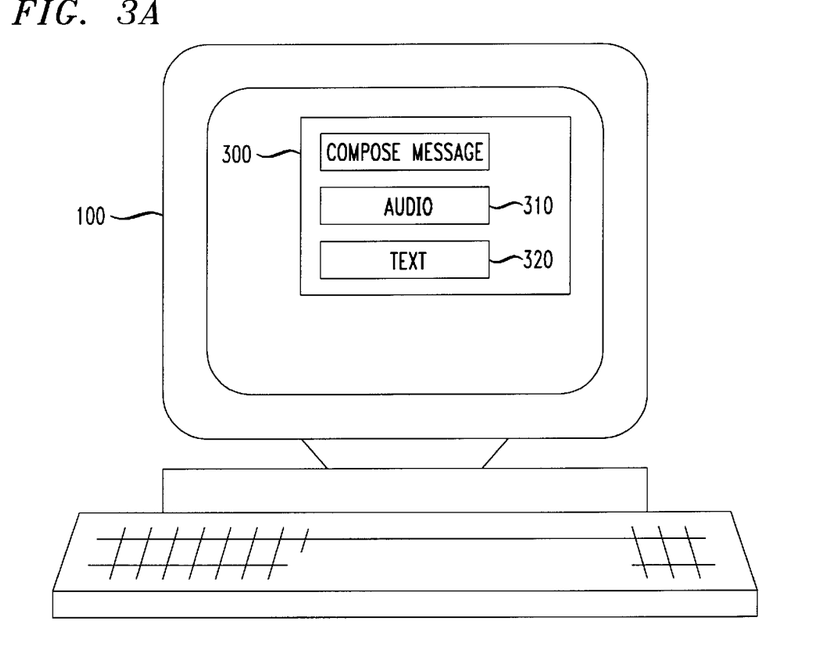
FIG. 3A illustrates one embodiment of a pop-up window for composing a response message to an incoming call in accordance with the present invention.

After selecting the reply option window 216, the called party will be presented with Compose Message pop-up window 300, as illustrated in FIG. 3A, which provides options to the called party for responding to the incoming call by composing a response message. Compose Message window 300 presents the options to the called party of either replying to the incoming call by sending a non-real time audio message or by sending a non-real time text message. If the called party desires to send an audio message as a response message, the called party would select audio window 310 by clicking on the window. If the called party desires to send a text message as a response message, the called party would select text window 320.

Figure 3B:
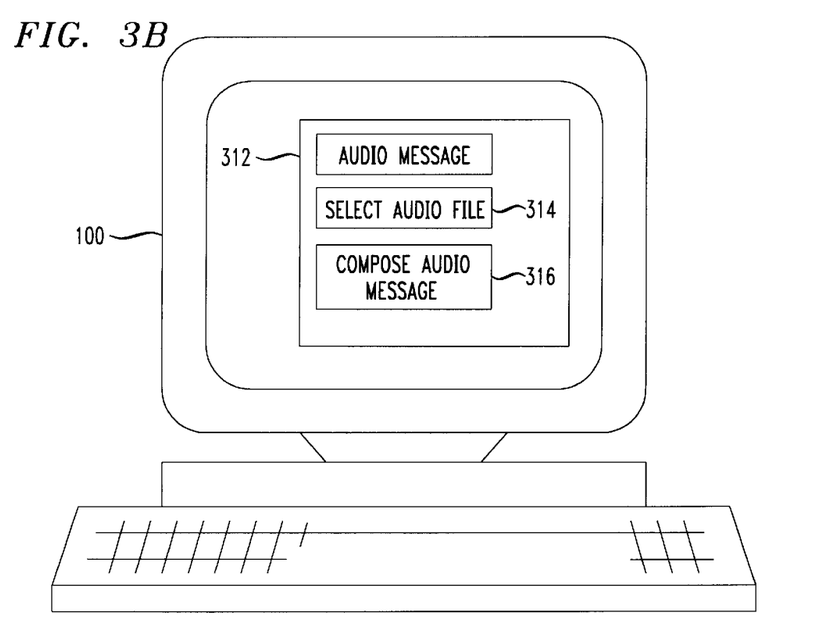
FIG. 3B illustrates one embodiment of an audio message pop-up window for composing an audio message in response to an incoming call in accordance with the present invention.

If the called party desires to send an audio message, after selecting audio window 310, audio message window 312 will be presented on the called party's computer as a pop-up window. FIG. 3B provides one embodiment for the content and format of audio message window 312. As shown in FIG. 3B, audio message window 312 presents the called party with two options for responding to the calling party by composing and sending an audio message to the calling party. The first option available to the called party is to select a stored audio file for replying to the calling party. The stored audio file may be stored in either the memory of the called party's computer or be provided by the data network service provide by downloading the files to the called party's computer. The second option available to the called party for responding with an audio message is to create an audio message by speaking into the computer's microphone 110.

If the called party desires to select an audio file for generating and sending an audio message to the calling party, the called party would select the Select Audio File window 314. After selecting this option, the called party would be presented with a listing from which to choose the audio files that are stored and available for responding to the incoming call. Each stored file could contain a different message. The called party would select the file to send to the calling party which would be appropriate for the called party's circumstances at that time. For example, if the called party anticipates that they will not be available to return the call until the next day, the called party could select a file that contains this message and send this message to the calling party. In this manner, a specific file could be selected to provide a particular audio response to each incoming call depending upon the called party's circumstances.

When selecting a particular file to respond to the incoming call, the file can either be a pre-defined file, as discussed above, or can be a file that contains a pre-defined message with options available for allowing the called party to more specifically tailor the message to the particular incoming call. For example, the sample message used for illustration above could be modified by the called party, by speaking into microphone 110 to modify the wavefile audio message, to indicate that the called party will be available to accept an incoming call in 5 hours as opposed to being available the next day.

The called party can also provide an audio message to respond to the incoming call by speaking into the computer's microphone 110 and composing a message. The called party would select the Compose Audio Message window 316 to pursue this option for responding. The called party would compose and generate the particular message to be sent to the calling party by speaking into microphone 110. The called party's computer, through using known speech-to-data conversion software, would encode the called party's audio message into a digital data stream for transmission to the data network service provider.

For both options presented above for responding to the incoming call by providing an audio message, the audio message response, as encoded in a digital data stream, is transmitted to data network service provider 150 over telephone transmission line 130 and transmission line 145. The digital audio message response is interleaved with any other data being transmitted by the called party's computer 100 to network service provider 150. Telephony gateway 156 receives the digital audio message response. Telephony gateway 156 answers the call to the LEC and then converts the digital audio message response into an analog voice signal and transmits the analog voice signal to LEC 140. LEC 140 provides the connection for transmitting the analog voice message to the calling party's telephone 160 for responding to the incoming call.

As stated previously, the called party can also respond to the incoming call by generating and sending a text message to the telephony gateway for further transmission to the LEC and calling party. If the called party desires to compose and send a text message to the calling party, the text message is sent as a digital data stream by the called party's computer 100 to network service provider 150 and telephony gateway 156. In the same manner as was described above for transmitting a digital audio response message, the digital text message response is transmitted to telephony gateway 156 by interleaving the message with any other data being transmitted by the called party's computer 100 to network service provider 150. Telephony gateway 156 converts the digital data stream into an analog voice message by using known text-to-speech conversion software. After conversion of the digital data to an analog voice message, telephony gateway 156 answers the call to the LEC and then transmits the analog voice message to LEC 140 where LEC 140 will direct the voice message to the calling party by utilizing the phone connection that has been established with the calling party's phone 160.

Figure 3C:
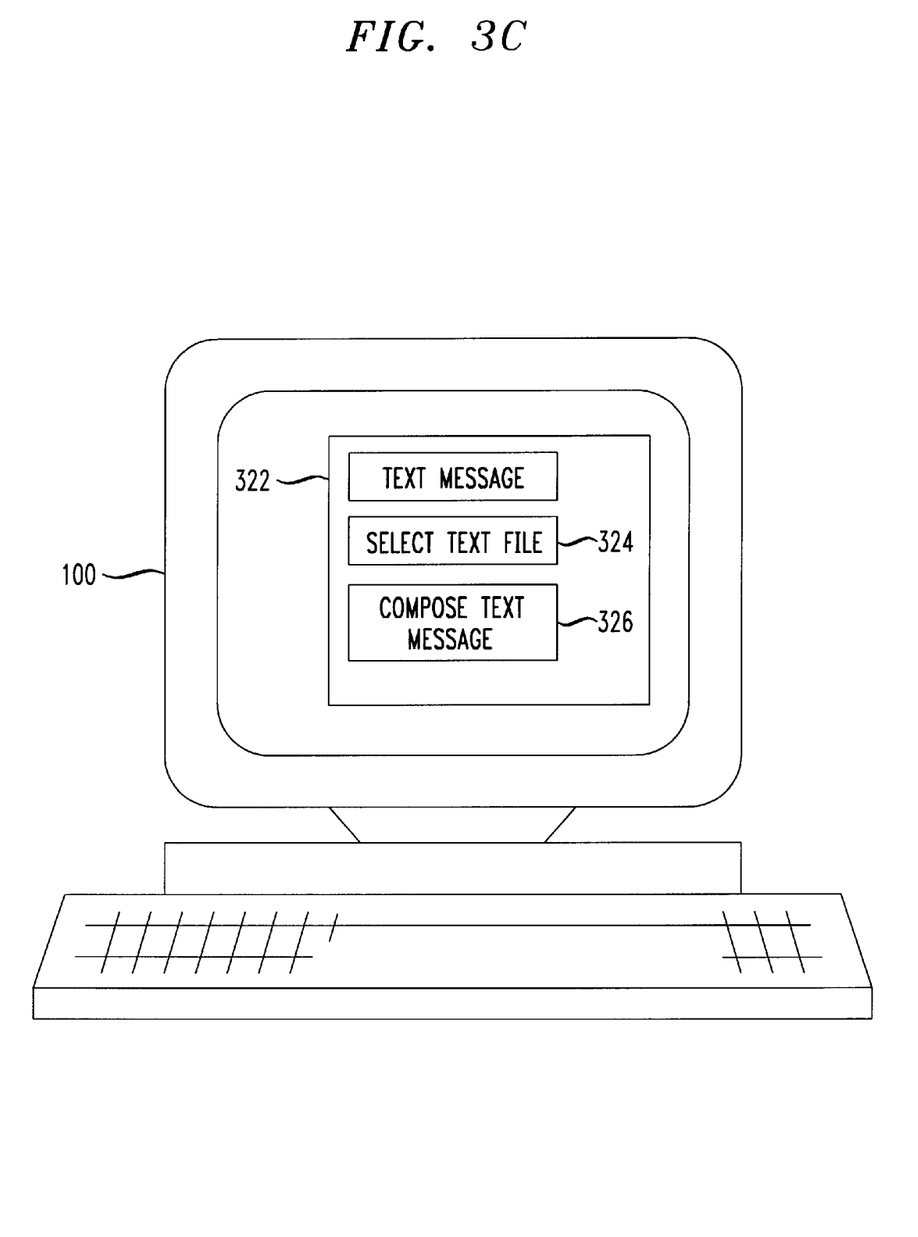
FIG. 3C illustrates one embodiment of a text message pop-up window for composing a text message in response to an incoming call in accordance with the present invention.

As with the multiple options available to the called party for composing an audio message to respond to the incoming call, the called party also has several options available to them for composing a text message for responding to the incoming call. As shown in FIG. 3A, the Compose Message pop-up window 300 provides the option to the called party for responding to the incoming call by composing a text response message. To compose a text response message, the called party would select text window 320 by clicking on the window. After selecting text window 320, the called party will be presented with text message pop-up window 322, as depicted in FIG. 3C. Window 322 presents the called party with the options of selecting a text file, window 324, or composing a text message, window 326.

If the called party chooses to reply by utilizing a text file, the called party will select window 324. After selection of window 324, as with the audio message files discussed previously, the called party will be presented with stored text files from which they may choose to respond to the incoming call. The called party may either select a pre-defined text file to send to the calling party or may select and modify a pre-defined text file by filling in the blanks of a text message template.

A second option for responding to the incoming call by way of a text message is for the called party to compose and generate a text message by typing in the message by utilizing the computer's keyboard. In pursuing this option, the called party would select window 326 from text message window 322. Selection of this window would result in presentation of a text box on the called party's computer which the called party would then utilize to generate the message, by typing in the message, that they want to have transmitted back to the calling party in response to the incoming call. The text box could be of limited width, e.g. 75 characters, in order to ensure that the reply message is sufficiently brief to avoid undue delays to the calling party in receiving the response message. In this manner, the called party could compose and transmit a specific response to an incoming call by utilizing a text message.

With either of the two options discussed above for providing a text message response to the calling party, the user's computer 100 would transmit the text message to the data network service provider 150 as a digital data stream. Telephony gateway 156 converts the digital text 30 message into an analog voice signal utilizing known text-to-speech software, answers the call to the LEC, and then transmits the analog signal to LEC 140. LEC 140 would then provide the converted text message to the calling party's phone 160 via the telephone connection that has been established.

Figure 4:
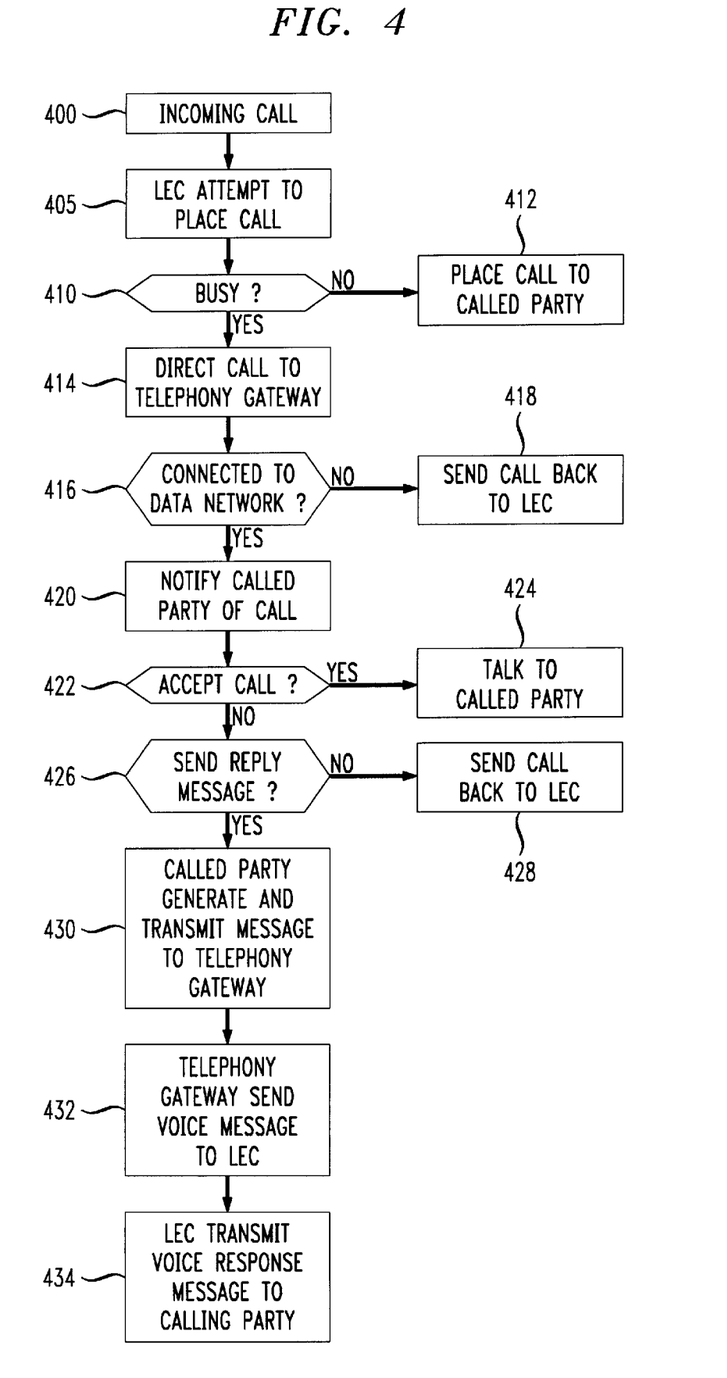
FIG. 4 is a flow chart for the steps involved in responding to an incoming call by composing and sending a reply message in accordance with the present invention.

In operation, the process steps for practicing the present invention are summarized and shown in FIG. 4. As shown, the process begins with an incoming call to the called party, step 400. In step 405, the local exchange carrier will attempt to place the call to the called party. In attempting to establish the call, the LEC will determine if the called party's phone is busy, step 410. If the called party's phone is not busy, the LEC will place the call to the called party, step 412. If the called party's phone is busy, the LEC will direct the call to the telephony gateway in the data network service provider, as shown in step 414. Step 416 is the determination by the telephony gateway as to whether the called party is currently interconnected to the data network service provider. As discussed previously, the telephony gateway will check the mapping tables in the network service provider to determine if the called party is logged into the data network service provider. If the called party is not logged into the service provider, the telephony gateway will send the call back to the LEC, as represented by step 418, and the LEC will dispose of the call in accordance with established LEC procedures.

If the called party is logged into the network service provider, then as shown in step 420, the telephony gateway will notify the called party that they have an incoming call and will present options to the called party for handling the call. Step 422 determines if the called party wants to accept the call. If the called party does accept the call, step 424, the called party will directly communicate with the calling party as previously described in this specification. If the called party does not accept the call, the called party will decide if they want to respond to the incoming call by sending a reply message. This decision is represented by step 426. If the called party does not want to send a reply message, step 428, the call will be sent back to the LEC for processing by the LEC according to established LEC operating procedures. If the called party does want to respond to the incoming call by sending a reply message, step 430 shows that the called party will generate a message and send the message to the telephony gateway. The called party will generate either an audio or text message in accordance with the disclosure provided previously in this specification. After generating the message and sending the message to the telephony gateway, step 432 shows that the telephony gateway will answer the call to the LEC and then convert the digital data which encodes the message to an analog voice message and send this voice message to the LEC. The LEC will then provide the voice message to the calling party's phone over the established telephone connection, as shown in step 434.

As mentioned previously, the embodiments disclosed above for practicing the present invention are illustrative and several variations on the disclosed embodiments are contemplated.

In the disclosed embodiments, the called party is presented with the options of accepting the call or ignoring the call, in addition to the option of responding to the call by sending a message. The options of accepting the call or ignoring the call are not required in practicing the invention and may be eliminated. Additionally, an option could be provided to direct the incoming call to a voice response unit in the network service provider where a pre-programmed response, not generated by the called party in response to the particular incoming call, would be provided to the calling party.

With respect to generating a reply message to the incoming call, several options were presented. However, the present invention is not limited to these message generation techniques and numerous other alternatives and options could be implemented.

Additionally, the present invention could be provided with the feature of having the telephony gateway send a pre-programmed message to the calling party immediately upon receipt of the incoming call from the LEC to notify the calling party that the network is attempting to complete the call. This immediate response message would serve to notify the calling party that the call was being processed and would help to ensure that the calling party does not terminate the connection while waiting for the called party's message response to be generated and transmitted.

Additional information that could be provided to the called party when notified of an incoming call is identification information about the calling party, e.g. the calling party's telephone number. This information may assist the called party in composing a more specific response to that particular calling party. The calling party's telephone number could be provided to the called party by utilizing well-known techniques for providing this information, such as a "caller ID" service.

An additional variation contemplated is that the "pop-up" response windows for responding to the incoming phone call can either be downloaded from the network service provider to the called party's computer or can be resident in the called party's computer and be activated by a signal sent from the telephony gateway to the called party's computer. The functionality of the "pop-up" windows remains unchanged regardless of how implemented.

What is claimed is:

1. A method for responding to a telephone call of a calling party when the called party is utilizing the called party's telephone transmission line to provide interconnection of the called party's computer to a data network comprising the steps of:

receiving a signal indicating that an incoming call from a calling party is awaiting delivery to the called party;

providing response message options to the called party over the called party's telephone transmission line, said response message options including selecting a pre-defined audio message stored in an audio file, the Pre-defined audio message stored in the audio file being modifiable by the called party after the pre-defined audio message has been selected;

receiving a response message generated by the called party over the called party's telephone transmission line; and providing to the calling party a voice message based at least partly upon the response message.

2. The method for responding to the telephone call of a calling party when the called party is utilizing the called party's telephone transmission line to provide interconnection to a data network according to claim 1 wherein said step of providing response message options to the called party over the called party's telephone transmission line includes downloading a message response input template to said called party's computer wherein said message response input template is utilized to generate said response message to the calling party.

3. The method for responding to the telephone call of a calling party when the called party is utilizing the called party's telephone transmission line to provide interconnection to a data network according to claim 1 wherein said response message options include composing an audio message by the called party.

4. The method for responding to the telephone call of a calling party when the called party is utilizing the called party's telephone transmission line to provide interconnection to a data network according to claim 1 wherein said response message options include generating a text message.

5. The method for responding to the telephone call of a calling party when the called party is utilizing the called party's telephone transmission line to provide interconnection to a data network according to claim 1 wherein said response message options include selecting a pre-defined text message stored in a data file.

6. The method for responding to the telephone call of a calling party when the called party is utilizing the called party's telephone transmission line to provide interconnection to a data network according to claim 5 wherein said pre-defined text message stored in a data file is able to be modified by the called party.

7. The method for responding to the telephone call of a calling party when the called party is utilizing the called party's telephone transmission line to provide interconnection to a data network according to claim 1 wherein said data network is a public data network.

8. The method for responding to the telephone call of a calling party when the called party is utilizing the called party's telephone transmission line to provide interconnection to a data network according to claim 1 wherein said signal indicating that an incoming call from a calling party is awaiting delivery to the called party is received from a telephone network.

9. The method for responding to the telephone call of a calling party when the called party is utilizing the called party's telephone transmission line to provide interconnection to a data network according to claim 1 wherein said signal indicating that an incoming call from a calling party is awaiting delivery to the called party is received by a data network service provider.

10. The method for responding to the telephone call of a calling party when the called party is utilizing the called party's telephone transmission line to provide interconnection to a data network according to claim 1 wherein said step of providing response message options to the called party over the called party's telephone transmission line includes providing the called party with identification information for the calling party.

11. The method for responding to the telephone call of a calling party when the called party is utilizing the called party's telephone transmission line to provide interconnection to a data network according to claim 10 wherein said identification information for the calling party is the calling party's telephone number.

12. A method for responding to a telephone call of a calling party when the called party is utilizing the called party's telephone transmission line to provide interconnection of the called party's computer to a data network comprising the steps of:

receiving a response message generated by the called party over the called party's telephone transmission line in response to notification of the called party that the called party has an incoming call from a calling party, the response message being an audio message, the audio message including a modified pre-defined message stored in an audio file;

generating a voice message by utilizing said response message; and providing said voice message to the calling party in response to the incoming call.

13. The method for responding to the telephone call of a calling party when the called party is utilizing the called party's telephone transmission line to provide interconnection to a data network according to claim 12 further comprising the step of providing a pre-programmed message to the calling party while awaiting receipt of said response message generated by the called party.

14. The method for responding to the telephone call of a calling party when the called party is utilizing the called party's telephone transmission line to provide interconnection to a data network according to claim 12 wherein said response message includes an audio message generated from a text message.

15. The method for responding to the telephone call of a calling party when the called party is utilizing the called party's telephone transmission line to provide interconnection to a data network according to claim 14 wherein said text message is a pre-defined text message stored in a data file.

16. The method for responding to the telephone call of a calling party when the called party is utilizing the called party's telephone transmission line to provide interconnection to a data network according to claim 15 wherein said pre-defined text message stored in a data file is modified by the called party.

17. The method for responding to the telephone call of a calling party when the called party is utilizing the called party's telephone transmission line to provide interconnection to a data network according to claim 12 wherein said data network is a public data network.

18. The method for responding to the telephone call of a calling party when the called party is utilizing the called party's telephone transmission line to provide interconnection to a data network according to claim 12 wherein said response message generated by the called party is received by a data network service provider.

19. The method for responding to the telephone call of a calling party when the called party is utilizing the called party's telephone transmission line to provide interconnection to a data network according to claim 12 wherein said voice message is generated by a data network service provider.

20. A method of providing an information message from a called party to a calling party, comprising:

determining that a call from the calling party to the called party was not completed to the called party because a communications line of the called party is providing a connection to a network;

sending response message options over the communications line, the response message options including selecting a pre-defined audio message stored in an audio file, the audio file being modifiable by the called party after the pre-defined audio message has been selected;

receiving a response message over the communications line; and sending to the calling party an information message based at least partly upon the response message.

\* \* \* \* \*